UNITED STATES PATENT OFFICE.

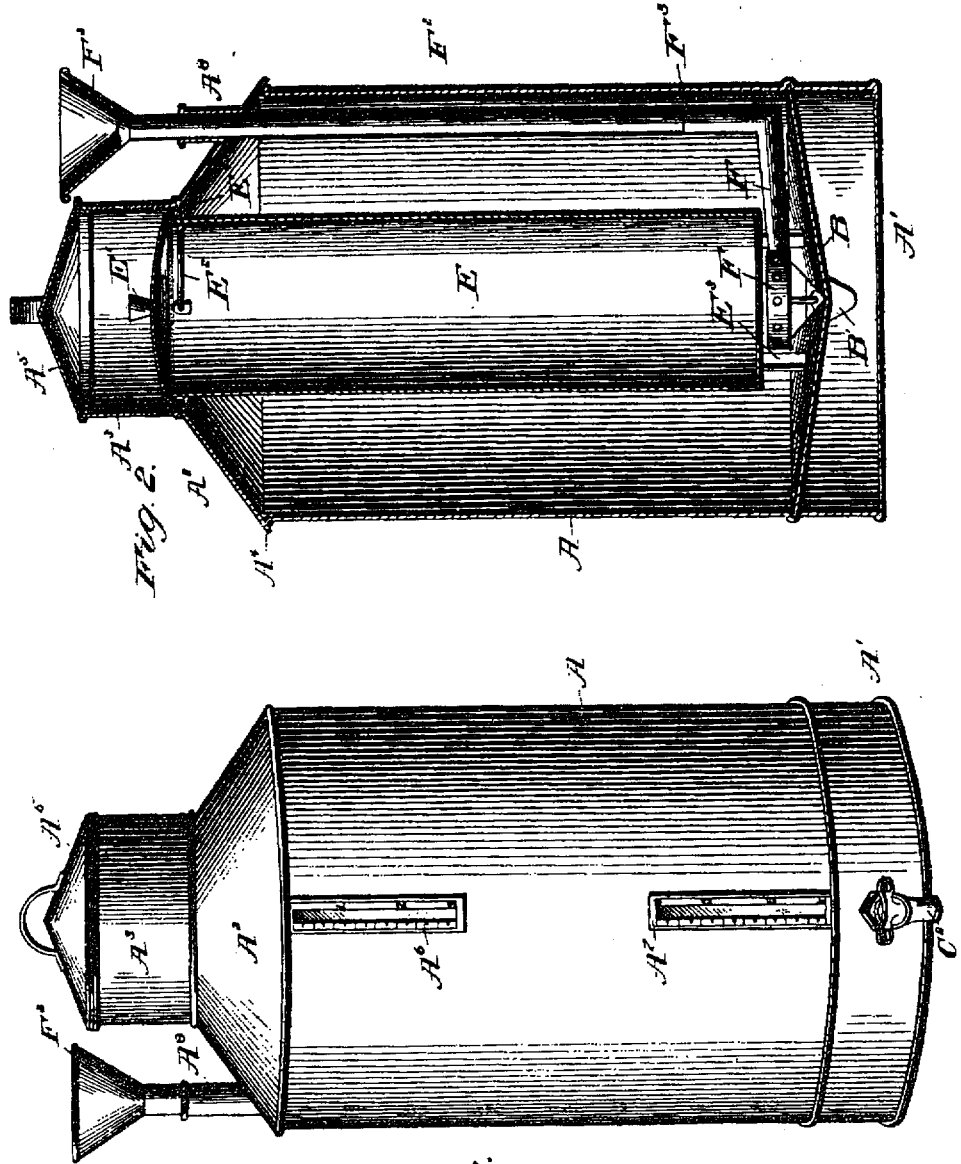

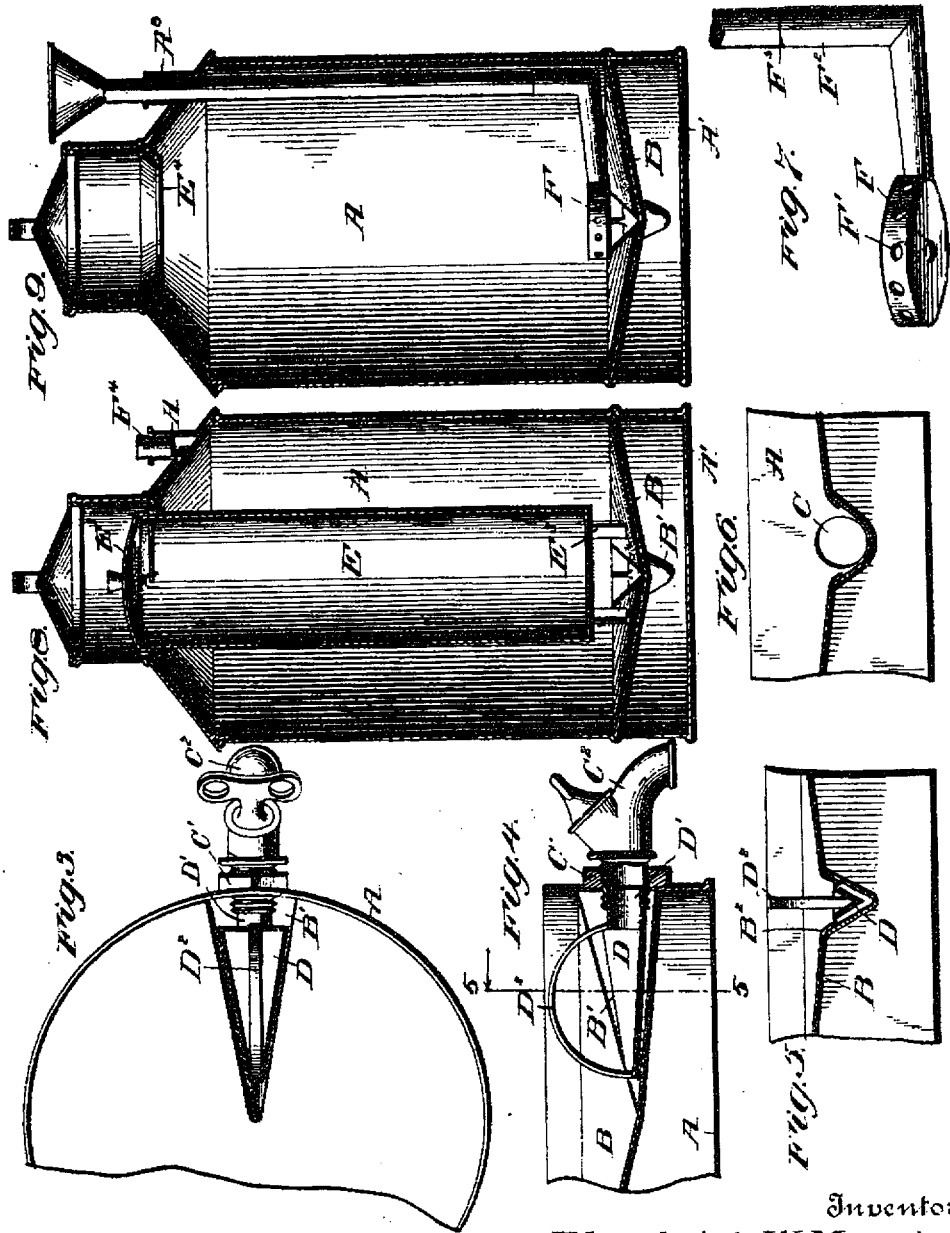

FREDRICK W. MOSELEY, OF CLINTON, IOWA.

CREAM-SEPARATOR.

SPECIFICATION forming part of Letters Patent No. 658,455, dated September 25, 1900.

Application filed October 12, 1899. Serial No. 733,387. (No model.)

*To all whom it may concern:*

Be it known that I, FREDRICK W. MOSELEY, a citizen of the United States, residing at Clinton, in the county of Clinton, State of Iowa, have invented certain new and useful Improvements in Cream-Separators, of which the following is a specification, reference being had therein to the accompanying drawings.

This invention relates to cream-separators, and more particularly to a combined cream-separator, milk-cooler, and refrigerating-can for the storage and transportation of milk or cream.

One object of the invention is to provide a can by which several independent methods of cream separation may be effected and a cooling and transportation can provided.

The can is particularly adapted for the following methods of cream separation:

First. The Swedish is a system by which the cream can be separated from the milk in from two to three hours by the rapid reduction of temperature, which condenses the watery portion of the milk, thus giving the oily (butter-fat) portion a denser medium to float in. Hence the cream-globules, being lighter, will rise easily and quickly to the surface. This system is usually practiced by introducing the milk into the can at or near its normal temperature when drawn from the cow and then reducing this temperature to about 45° by the use of ice or cold water.

Second. The diluting system, in which the cream may be separated from the milk in from sixty to ninety minutes by the addition to the milk of an equal amount of water. The milk in its normal condition contains about thirteen per cent. of solid matter, which includes butter-fat, 3.6 per cent.; casein, 3.3 per cent.; albumen, .7 per cent.; milk-sugar, 4.7 per cent., and ash, .7 per cent. Casein, sugar, and albumen give to the milk a glutinous condition, which retards the cream from readily and quickly rising. This condition is known as "viscosity" and may be reduced by a proper dilution of the milk with water, so that the cream will be separated therefrom and rise to the top.

Third. A combined system which includes both the reduction in the temperature of the milk and the introduction of water to reduce its viscosity. In this system from four to five hours are required, according to the temperature of the water, and inasmuch as the cream is separated within a practically short time and the skim-milk is but slightly diluted is found very desirable. The amount of dilution with water varies from ten to twenty per cent., dependent upon the degree of cold to which the milk is subjected and the character of the milk and temperature when set.

The invention has for a further object to provide a construction for cooling milk or cream as a preparation for storage or transportation and to produce a can in which such milk or cream may be maintained at a low degree of temperature and easily and economically stored or transferred from point to point.

Another important object of the invention is to provide a sediment device for catching and holding the sediment which collects at the bottom of a can of milk and preventing the withdrawal of the same from the bottom of the can when the milk or cream is drawn for use or for the final separation of the cream from the milk.

Other objects and advantages of the invention will hereinafter appear in the following description, and the novel features thereof are particularly pointed out in the appended claims.

In the drawings, Figure 1 is a perspective of the creaming-can. Fig. 2 is a vertical cross-section thereof. Fig. 3 is a plan of the inclined bottom of the can and sediment-chamber. Fig. 4 is a vertical section of the same. Fig. 5 is a detail cross-section on the line 5 5 of Fig. 4, looking in the direction of the arrow. Fig. 6 is a similar section looking in the opposite direction to that of the arrow and with the sediment-dam removed. Fig. 7 is a detail perspective of the water-distributer, and Figs. 8 and 9 are vertical sections showing different assemblages of the parts of the can for carrying out different systems of cream separation.

Like letters of reference indicate like parts throughout the several figures of the drawings.

The letter A designates the can-body, which may be of cylindrical or other desired form and is provided with a base A' and at its upper end with a breast A², merging into a neck portion A³. This breast may be removably connected to the body A by means of a joint A⁴, which thus permits a ready cleansing of the can when necessary, and the upper end of the neck is provided with an ordinary construction of cover A⁵. Above the base A' of the can is a pitched or conical bottom B, inclining from its periphery toward a central point. This is provided from its lowest central point with a radiating channel B', which at its outer end is lower than the lowest point of the bottom B and expands in diameter toward the periphery of the bottom, thus providing a chamber into which may drain any sediment deposited at the lower portion of the can. This sediment channel or chamber is preferably formed of a separate piece of material from the bottom and joined thereto at the overlapping edges B². By this construction the sediment-channel may be inclined to a sufficient degree to drain from the lowermost point of the bottom B; but if found desirable the bottom could be inclined at an angle toward the front of the can and the channel formed integral therewith by a suitable depression of the material. At the outer end of this channel an opening C is formed in the face of the body A and provided with a threaded boss or nut C', secured thereto, into which any suitable form of draw-off cock or faucet C² may be introduced. The structure thus far described would permit any sediment in the chamber B' to be drained off through the faucet C²; but to prevent this sediment from passing through the faucet when milk or cream is to be drawn therethrough a sediment-dam D is provided, having a neck D', adapted to closely fit within the end of a shank of the faucet and to be spaced at a distance from the opposite walls of the channel B'. This dam is provided with a handle D², by which it may be readily removed or replaced in position, as desired, and in its general shape conforms to that of the channel in which it lies, although it is of less diameter than said channel.

In the operation of the invention it will be seen that the milk or cream in order to pass from the can must enter the sediment-dam D, and as this dam is separated at all of its points from the bottom the sediment or other material lying upon this bottom will be carried into the space between the edges of the dam and those of the sediment-chamber, and thus deposited in said chamber, while the body of milk above the bottom will pass into the dam and through the neck thereof to the faucet when desired. The current of the milk caused by the opening of the faucet carries the sediment toward the chamber, and after the milk and cream are withdrawn from the can the dam can readily be removed and the sediment remaining in the chamber withdrawn through the same faucet, as can also any water which may be used for the purpose of cleansing the can. The proper time for withdrawing the cream and sediment can readily be determined by means of the gage A⁶ at the upper portion and gage A⁷ at the lower portion of the can. By the former the amount of cream collected at the top of the milk may be readily ascertained, and the lower gage will indicate when the body of milk has been withdrawn from the cream, so that a different receptacle may be placed beneath the faucet to receive the cream from the can.

In carrying out the several processes hereinbefore mentioned it is essential to cool the milk, and this has been frequently done by surrounding the same by a body of cold water or ice, or both. In connection with the present invention, however, a removable cooling-chamber E has been provided, which is surrounded by the material to be cooled, and thus renders effective all of the cooling material used. The cooling-chamber is provided with a cover E' and lifting-handle E², by which it may be removed from the can through the neck A³, and at its bottom with supporting-legs E³ to maintain the same in a proper position above the conical bottom B. Attention may also be called to the flange E⁴, provided at the base of the neck, by which the milk poured into the can is directed in a thin stream into contact with the cold surface of the chamber E and passing down the same is quickly cooled upon its introduction into the can.

For the purpose of diluting the milk to any degree desirable consistent with the system of separation employed a water-distributer F is provided and located at the lowest central point of bottom B directly beneath the base of the cooling-chamber, when the same is in use. This distributer may be of any desired configuration and provided with any form of distributing-apertures—for instance, those shown at F'—and is connected with the exterior of the can by means of a jointed connecting-pipe F², leading through a collar A⁸, provided upon the breast A², and has at its upper end a funnel F³ to guide the introduction of water thereto. It will readily be seen that this distributer can be removed from the can by separating the joint at F³, and the distributing-apertures are so disposed in the sides and bottom as to drain from the distributer any milk or cream which may pass into the same if it be left within the can and also to facilitate a cleansing thereof by projecting water upon the bottom and into the discharge-channel at its highest point, so as to thoroughly cleanse the same. If it be desired not to use the water-distributer, the collar A⁸ may be suitably closed by means of a plug F⁴, as shown in Fig. 8.

In accomplishing the different methods of cream separation and objects of this invention the parts may be used in different assemblages to effect the various results. When using the can to practice the Swedish system of cream separation, the cold water or ice will be placed or packed within the cooling-chamber E, and as the walls thereof are completely surrounded by the milk to be cooled the reduced temperature thereof will be transmitted in the fullest degree to the milk. As the cream rises within the space of two or three hours, the same will be indicated upon the upper gage, and at that time the milk can be withdrawn from the cream and the cream afterward removed in a separate vessel. It may be stated that the cover to the cooling-chamber is in place when the strained milk is poured into the can, and the flange E¹ directs this milk against the cold surface of the cooling-can. This can is also used in position when it is desired to refrigerate the milk either in storage or for transportation, and in such uses the can is adapted for use as a receptacle from which milk or cream may be sold. The assemblage of parts for the purposes just stated is shown in Fig. 8; but it is obvious that the water-distributer may be left in position, if desired, as shown in Fig. 2.

In practicing the diluting system the cooler will be removed and the water-distributer F placed in position, as shown in Fig. 9. Milk is then introduced not to exceed one-half the capacity of the can, and the remainder of the can is filled with water introduced through the funnel F³, communicating with the distributer. The milk should be near its normal temperature and the colder the water the better the results obtained.

For the practice of the combined system of cream separation the water distributer and cooler are to be in their respective positions, as shown in Fig. 2. The cooler is to be filled with water, the colder the better. Put on the cooler-cover and pour in the strained milk, not to exceed eighty-five per cent. of the capacity of the milk vessel A. Then introduce through funnel water equal to from ten to twenty per cent. of the quantity of the milk. The nearer the temperature of the milk to that at which drawn from the cow and the colder the water the smaller will be the per cent. of the latter required. The separated milk and cream may be withdrawn as hereinbefore described.

The can and cooler may be also used for the purpose of reducing the temperature of milk by passing the same through the can one or more times, as may be required to obtain the desired temperature. It will be also obvious that the can may be assembled in various ways to accomplish other methods of cream separation or the cooling, storage, or transportation of milk or cream. It has also been found particularly desirable to introduce the water used in diluting systems at the lowest central point of the bottom of the milk-can, while the particular construction of concave bottom with its radiating channel and sediment-dam are effectual in any use of the can by which the milk is drawn from the faucet at its base.

It will be obvious that numerous changes may be made in the details of construction of the various parts of the can and of the configuration thereof without departing from the spirit of the invention as defined by the appended claims.

Having described my invention, what I claim as new, and desire to secure by Letters Patent, is—

1. A receptacle having a conical or centrally-depressed bottom and a radiating discharge-channel extending to an outlet at the periphery thereof, and a sediment-dam spaced from the walls of said channel and having a discharge-passage communicating with said outlet; substantially as specified.

2. A receptacle having a conical or centrally-depressed bottom and a discharge-channel leading downward from the center of said bottom to an outlet-aperture, a sediment-dam disposed in said channel at a distance from the walls thereof and having a discharge-neck communicating with said outlet-aperture; substantially as specified.

3. A receptacle having a conical or centrally-depressed bottom and a radiating discharge-channel extending to an outlet at the periphery thereof, a discharge-cock located at said outlet and having a shank extending therefrom, and a sediment-dam supported by said shank and spaced from the walls of said channel to permit the collection of sediment in said channel beneath the said sediment-dam; substantially as specified.

4. A receptacle having a conical or centrally-depressed bottom and a radiating discharge-channel extending to an outlet at the periphery thereof, a discharge-cock located at said outlet and having a shank extending therefrom, a sediment-dam supported by said shank and spaced from the walls of said channel to permit the collection of sediment in said channel beneath the said sediment-dam, a tubular end to said sediment-dam adapted to enter the shank of said cock, and a removing-handle extending upward from said sediment-dam; substantially as specified.

5. A creaming-can having a reduced neck at its upper portion, a cooling vessel within said can and extending upward into said neck, and means whereby liquid is directed by the neck against the side walls of the vessel; substantially as specified.

6. A creaming-can having a reduced neck at its upper portion and a cooling vessel within said can and extending upward into said neck, and an annular flange carried by said neck and inclined toward said vessel to direct liquid against the surface of said cooling vessel; substantially as specified.

7. In a creaming-can, a removable water-distributer arranged within the can and disposed at the lower portion above the bottom thereof comprising a body having dischargeapertures in its side and bottom portions; substantially as specified.

8. A creaming-can having a removable breast and neck, a cooling vessel extending upward into said neck to form a receiving-chamber therein having an annular discharge-opening inclined toward said vessel, and supports to hold said vessel above the bottom of said can; substantially as specified.

9. A creaming-can provided with a centrally-depressed or conical bottom having a radiating channel extending to an outlet-aperture, and a sediment-dam comprising an open receptacle having side walls parallel with the walls of said channel and spaced from the walls thereof and having a discharge entering said aperture; substantially as specified.

10. A creaming-can, a cooling vessel supported in said can, and a flange at the base of the neck of said can and inclined toward said vessel to direct liquid into contact with said cooling vessel; substantially as specified.

In testimony whereof I affix my signature in presence of two witnesses.

FREDRICK W. MOSELEY.

Witnesses:
JOHN JACKSON,
KATHRYN L. DALTON.